US012759008B2

(12) United States Patent
Laudage

(10) Patent No.: US 12,759,008 B2
(45) Date of Patent: Oct. 13, 2026

(54) LIQUID APPLICATOR ASSEMBLY FOR MECHANICAL FASTENERS

(71) Applicant: RTX Corporation, Farmington, CT (US)

(72) Inventor: Steven C. Laudage, Portland, ME (US)

(73) Assignee: RTX Corporation, Farmington, CT (US)

( * ) Notice: Subject to any disclaimer, the term of this patent is extended or adjusted under 35 U.S.C. 154(b) by 509 days.

(21) Appl. No.: 18/238,199

(22) Filed: Aug. 25, 2023

(65) Prior Publication Data

US 2025/0067394 A1 Feb. 27, 2025

(51) Int. Cl.

| | |
|---|---|
| ***B05C 1/02*** | (2006.01) |
| ***B05C 3/09*** | (2006.01) |
| ***B05C 11/10*** | (2006.01) |
| ***B05C 13/02*** | (2006.01) |
| ***F16N 25/04*** | (2006.01) |
| *B05C 3/04* | (2006.01) |
| *B05C 11/02* | (2006.01) |

(52) U.S. Cl.

CPC .................. *B05C 3/09* (2013.01); *B05C 1/02* (2013.01); *B05C 11/10* (2013.01); *B05C 13/025* (2013.01); *F16N 25/04* (2013.01); *B05C 3/04* (2013.01); *B05C 11/025* (2013.01)

(58) Field of Classification Search

None

See application file for complete search history.

(56) References Cited

U.S. PATENT DOCUMENTS

| | | | | |
|---|---|---|---|---|
| 4,353,941 A | | 10/1982 | Bowman | |
| 4,559,900 A | * | 12/1985 | Knapke | B05C 3/125 118/103 |
| 5,368,644 A | * | 11/1994 | Delgado | B05C 3/132 118/123 |
| 5,520,737 A | * | 5/1996 | Denton | B05C 3/09 118/400 |

(Continued)

FOREIGN PATENT DOCUMENTS

| | | |
|---|---|---|
| CN | 201613215 U | 10/2010 |
| CN | 106000757 B | 8/2018 |

(Continued)

OTHER PUBLICATIONS

EP Search Report for EP Patent Application No. 24196172.1 dated Feb. 18, 2025.

*Primary Examiner* — Binu Thomas
(74) *Attorney, Agent, or Firm* — Getz Balich LLC

(57) ABSTRACT

An applicator assembly for applying a liquid to at least one fastener includes a housing, a vat body, at least one applicator roller pair, and at least one removal roller pair. The housing includes a sidewall assembly. The sidewall assembly extends between and to a bottom end and a top end. The vat body is disposed within the sidewall assembly. The vat body extends between and to a bottom side and a top side. The vat body forms a liquid cavity at the top side. The at least one applicator roller pair is disposed within the liquid cavity. The at least one applicator roller pair includes a first applicator roller and a second applicator roller. The at least one removal roller pair is disposed between the liquid cavity and the top end. The at least one removal roller pair includes a first removal roller and a second removal roller.

17 Claims, 6 Drawing Sheets

(56) References Cited

U.S. PATENT DOCUMENTS

| | | | | |
|---|---|---|---|---|
| 5,586,618 | A * | 12/1996 | Francis | B05C 1/02 118/244 |
| 7,025,176 | B1 * | 4/2006 | Tooman | F16N 11/00 118/244 |
| 2010/0178429 | A1 * | 7/2010 | Presley | B05C 3/09 118/429 |
| 2013/0008746 | A1 | 1/2013 | Jankovic | |

FOREIGN PATENT DOCUMENTS

| | | | |
|---|---|---|---|
| CN | 111013925 | B | 6/2021 |
| CN | 112657788 | B | 2/2023 |

* cited by examiner

LIQUID APPLICATOR ASSEMBLY FOR MECHANICAL FASTENERS

BACKGROUND

1. Technical Field

This disclosure relates generally to mechanical fasteners and, more particularly, to an assembly for applying a viscous liquid to mechanical fasteners.

2. Background Information

Mechanical fasteners for machinery or other equipment may be coated with anti-seize paste, lubricant, or other viscous liquid compounds prior to assembly. Various processes for applying a viscous liquid to mechanical fasteners are known in the art. While these known processes have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an applicator assembly for applying a liquid to at least one fastener includes a housing, a vat body, at least one applicator roller pair, and at least one removal roller pair. The housing includes a sidewall assembly. The sidewall assembly extends between and to a bottom end and a top end. The vat body is disposed within the sidewall assembly. The vat body extends between and to a bottom side and a top side. The bottom side is disposed at the bottom end. The vat body forms a liquid cavity at the top side. The at least one applicator roller pair is disposed within the liquid cavity. The at least one applicator roller pair includes a first applicator roller and a second applicator roller. Each of the first applicator roller and the second applicator roller is configured for rotation about an applicator rotational axis. The at least one removal roller pair is disposed between the liquid cavity and the top end. The at least one removal roller pair includes a first removal roller and a second removal roller. Each of the first removal roller and the second removal roller is configured for rotation about a removal rotational axis.

In any of the aspects or embodiments described above and herein, the liquid cavity may extend along a center plane. The first applicator roller and the first removal roller may be disposed on a first lateral side of the center plane. The second applicator roller and the second removal roller may be disposed on a second lateral side of the center plane.

In any of the aspects or embodiments described above and herein, the vat body may be slidably mounted within the housing.

In any of the aspects or embodiments described above and herein, the sidewall assembly may include a front wall, a rear wall, a first lateral wall, and a second lateral wall. The first lateral wall and the second lateral wall may form guides extending from the front wall to the rear wall. The guides may be disposed at the top side of the vat body.

In any of the aspects or embodiments described above and herein, the applicator assembly may further include a gear assembly coupled with the at least one applicator roller pair and the at least one removal roller pair.

In any of the aspects or embodiments described above and herein, the gear assembly may include a worm screw and a plurality of worm gears. The plurality of worm gears may be meshed with the worm screw. Each worm gear of the plurality of worm gears may be coupled with a respective roller of the at least one applicator roller pair or the at least one removal roller pair.

In any of the aspects or embodiments described above and herein, the worm screw may include a first screw portion and a second screw portion. The first screw portion may have a first helical gear pattern. The second screw portion may have a second helical gear pattern. The first helical gear pattern may be opposite the second helical gear pattern. Each worm gear coupled with the respective roller of the at least one applicator roller pair may be meshed with the first screw portion. Each worm gear coupled with the respective roller of the at least one removal roller pair may be meshed with the second screw portion.

In any of the aspects or embodiments described above and herein, the applicator assembly may further include a motor. The motor may be coupled to the worm screw. The motor may be configured to drive rotation of the worm screw.

In any of the aspects or embodiments described above and herein, the first applicator roller may be configured to rotate in a first rotational direction. The first removal roller may be configured to rotate in a second rotational direction opposite the first rotational direction.

In any of the aspects or embodiments described above and herein, the vat body may form a first scraper and a second scraper on the top side. The first scraper may contact the first removal roller. The second scraper may contact the second removal roller.

In any of the aspects or embodiments described above and herein, the first scraper and the second scraper may be disposed at the liquid cavity.

In any of the aspects or embodiments described above and herein, the at least one removal roller pair may include a first removal roller pair and a second removal roller pair. The first removal roller of the first removal roller pair may contact the first removal roller of the second removal roller pair. The second removal roller of the first removal roller pair may contact the second removal roller of the second removal roller pair.

In any of the aspects or embodiments described above and herein, the applicator assembly may further include a fastener holder. The fastener holder may include a holder body. The holder body may extend between and to an upper end and a lower end. The holder body may be configured to retain the at least one fastener at the lower end. The fastener holder may be movable within the housing along the center plane.

In any of the aspects or embodiments described above and herein, the holder body may extend between and to a front side and a rear side. The holder body may form a slot at the lower end. The slot may extend from the front side to the rear side. The holder body may be configured to retain the at least one fastener within the slot.

According to another aspect of the present disclosure, an applicator assembly for applying a liquid to at least one fastener includes a housing, a vat body, at least one applicator roller pair, and at least one removal roller pair. The housing includes a sidewall assembly. The sidewall assembly extends between and to a bottom end and a top end. The sidewall assembly includes a front wall, a rear wall, a first lateral wall, and a second lateral wall. The vat body is slidably mounted within the housing at the bottom end. The vat body forms a liquid cavity. The at least one applicator roller pair is disposed within the liquid cavity. The at least one applicator roller pair includes a first applicator roller and a second applicator roller. Each of the first applicator roller and the second applicator roller is configured for rotation about an applicator rotational axis. The at least one removal roller pair is disposed between the liquid cavity and the top end. The at least one removal roller pair includes a first removal roller and a second removal roller. Each of the first removal roller and the second removal roller is configured for rotation about a removal rotational axis.

In any of the aspects or embodiments described above and herein, the front wall may form a vat slot. The vat body may be configured to move into and out of the housing through the vat slot.

In any of the aspects or embodiments described above and herein, the vat body may form a first scraper and a second scraper at the liquid cavity. The first scraper may contact the first removal roller. The second scraper may contact the second removal roller.

According to another aspect of the present disclosure, an applicator assembly for applying a liquid to at least one fastener includes a housing, a vat body, at least one applicator roller, and at least one removal roller. The housing includes a sidewall assembly. The sidewall assembly extends between and to a bottom end and a top end. The vat body forms a liquid cavity within the sidewall assembly. The liquid cavity extends along a center plane. The at least one applicator roller pair is disposed within the liquid cavity. The at least one applicator roller pair includes a first applicator roller and a second applicator roller. Each of the first applicator roller and the second applicator roller is configured for rotation about an applicator rotational axis. The first applicator roller is disposed on a first lateral side of the center plane. The second applicator roller is disposed on a second lateral side of the center plane. The at least one removal roller pair is disposed between the liquid cavity and the top end. The at least one removal roller pair includes a first removal roller and a second removal roller. Each of the first removal roller and the second removal roller is configured for rotation about a removal rotational axis. The first removal roller is disposed on the first lateral side. The second removal roller is disposed on the second lateral side.

In any of the aspects or embodiments described above and herein, the first applicator roller may be configured to rotate in a first rotational direction. The first removal roller may be configured to rotate in a second rotational direction opposite the first rotational direction.

In any of the aspects or embodiments described above and herein, the applicator assembly may further include a fastener holder. The fastener holder may include a holder body. The holder body may extend between and to an upper end and a lower end. The holder body may be configured to retain the at least one fastener at the lower end. The fastener holder may be movable within the housing along the center plane.

The present disclosure, and all its aspects, embodiments and advantages associated therewith will become more readily apparent in view of the detailed description provided below, including the accompanying drawings.

DETAILED DESCRIPTION

The present disclosure is directed to an applicator assembly for applying a viscous liquid to one or more mechanical fasteners. For some equipment applications, such as high-temperature aircraft engine applications, mechanical fasteners (e.g., bolts, screws, pins, etc.) may be coated with an anti-seize paste compound prior to installation into equipment. The anti-seize paste may be applied to the mechanical fasteners to prevent or mitigate gall, seizing, and/or corrosion of the mechanical fasteners, as well as to facilitate mechanical fastener lubrication. The conventional process for applying an anti-seize paste to a mechanical fastener includes manually brushing the paste onto the mechanical fastener. This process is time consuming and frequently causes excess anti-seize paste to be deposited on the mechanical fasteners, leading to increased use of consumables (e.g., anti-seize paste) as well as messy equipment assembly. The present disclosure applicator assembly provides particular utility for simultaneously applying an anti-seize paste to a plurality of mechanical fasteners. However, it should be understood that the present disclosure applicator assembly may be equally useful for applying other viscous liquids (e.g., lubricants) to mechanical fasteners.

Figure 1:
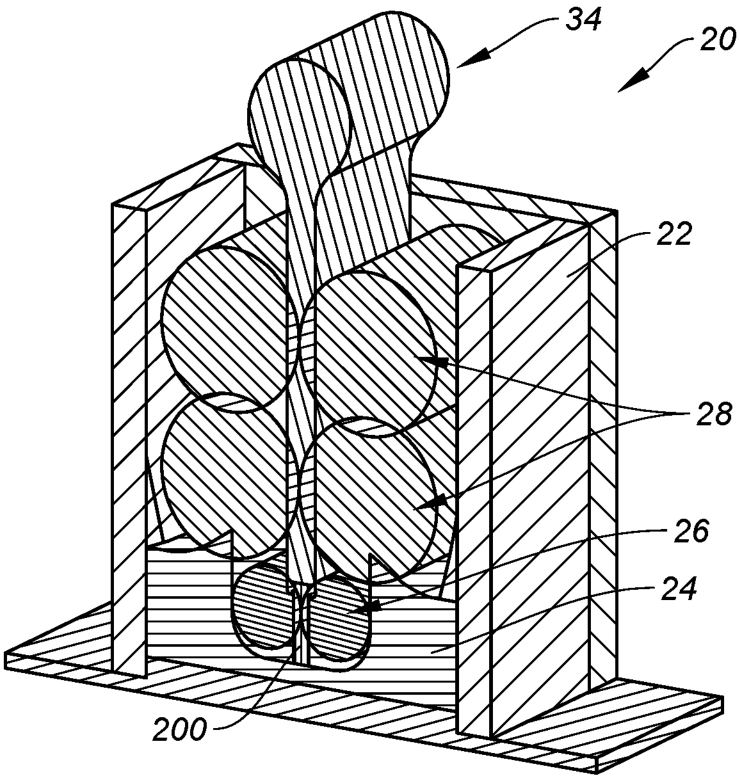
FIG. 1 illustrates a perspective, cutaway view of an applicator assembly for fasteners, in accordance with one or more embodiments of the present disclosure.
Figure 2:
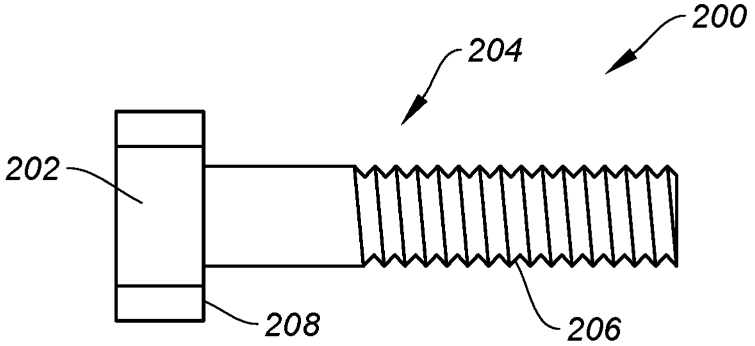
FIG. 2 illustrates a side view of an exemplary fastener, in accordance with one or more embodiments of the present disclosure.

FIG. 1 illustrates a perspective cutaway view of an applicator assembly 20 for applying a viscous liquid (e.g., an anti-seize paste) to one or more fasteners. The applicator assembly 20 includes a housing 22, a vat body 24, at least one applicator roller pair 26, and at least one removal roller pair 28. The applicator assembly 20 may additionally include a gear assembly 30 and/or at least one motor 32 (see FIG. 7). The applicator assembly 20 includes or is otherwise configured for use with a fastener holder 34. FIG. 2 illustrates an exemplary configuration of a fastener 200 onto which the applicator assembly 20 may be used to apply an anti-seize paste or other viscous liquid. The fastener 200 of FIG. 2 is configured as a bolt. However, it should be understood that the present disclosure is not limited to use with bolt mechanical fasteners. The fastener 200 of FIG. 2 generally includes a head 202 and a shaft 204 extending outward from the head 202. The head 202 forms a contact face 208 coincident with the shaft 204. The shaft 204 of FIG. 2 forms threading 206 extending about the shaft 204.

Figure 3:
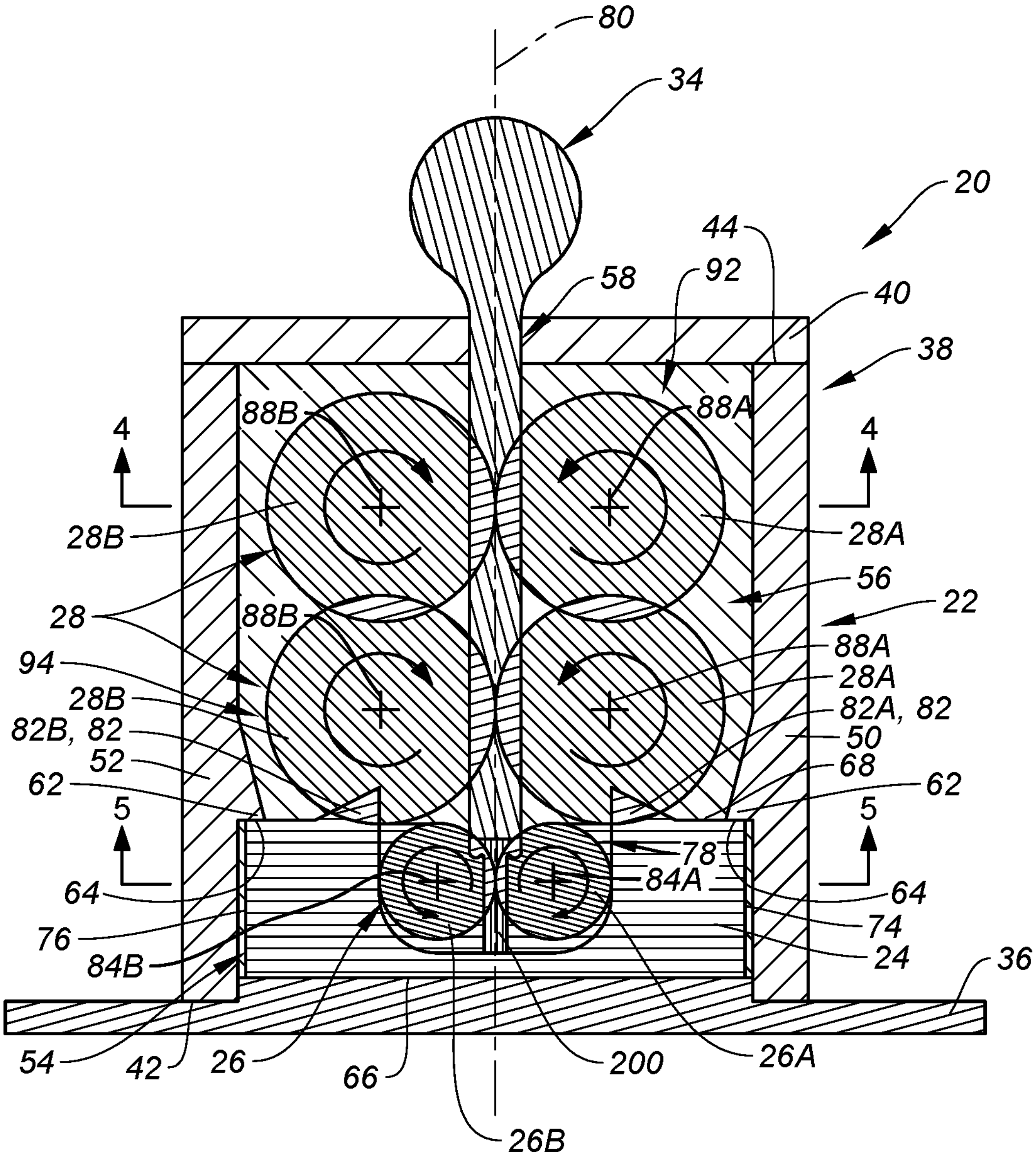
FIG. 3 illustrates a front, cutaway view of the applicator assembly of FIG. 1, in accordance with one or more embodiments of the present disclosure.
Figure 4:
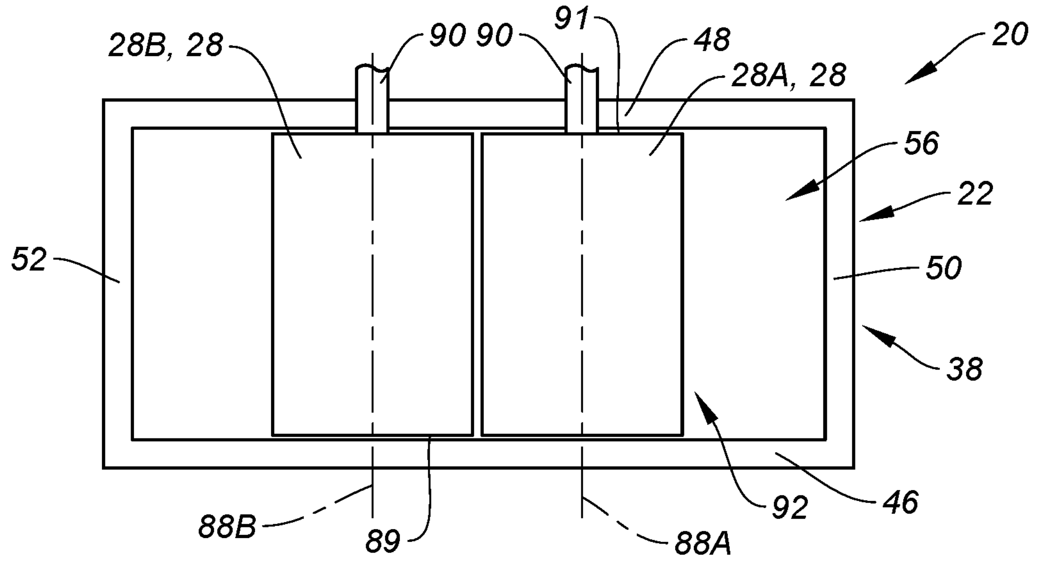
FIG. 4 illustrates a cross-sectional view of the applicator assembly of FIG. 3 taken along Line 4-4 of FIG. 3, in accordance with one or more embodiments of the present disclosure.
Figure 5:
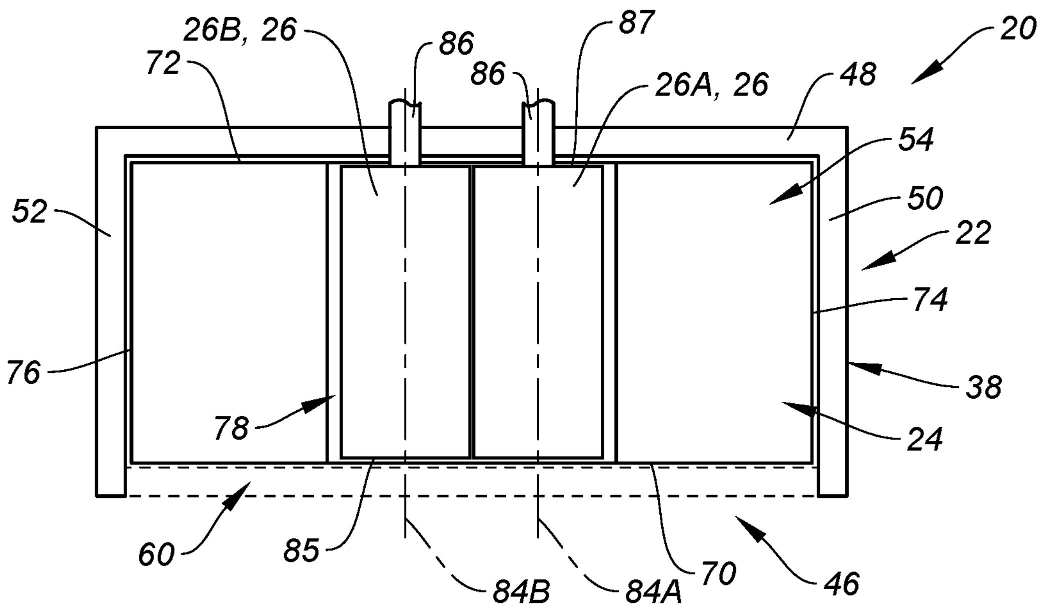
FIG. 5 illustrates a cross-sectional view of the applicator assembly of FIG. 3 taken along Line 5-5 of FIG. 3, in accordance with one or more embodiments of the present disclosure.

FIG. 3 illustrates a front, cutaway view of the applicator assembly 20. FIG. 4 illustrates a cross-sectional view of the applicator assembly 20 of FIG. 3 taken along Line 4-4 of FIG. 3. FIG. 5 illustrates a cross-sectional view of the applicator assembly 20 of FIG. 3 taken along Line 5-5 of FIG. 3. The fastener holder 34 is omitted in FIGS. 4 and 5 for clarity. Referring to FIGS. 3-5, the housing 22 includes a base 36 and a sidewall assembly 38. The housing 22 may further include a cover 40. The sidewall assembly 38 extends between and to a bottom end 42 of the sidewall assembly 38 and a top end 44 of the sidewall assembly 38. The bottom end 42 is mounted to or otherwise disposed at (e.g., on, adjacent, or proximate) the base 36. The sidewall assembly 38 includes a front wall 46, a rear wall 48, a first lateral wall 50, and a second lateral wall 52. Each of the front wall 46, the rear wall 48, the first lateral wall 50, and the second lateral wall 52 extends from the bottom end 42 to the top end 44. The first lateral wall 50 and the second lateral wall 52 extend between and to the front wall 46 and the rear wall 48. The front wall 46, the rear wall 48, the first lateral wall 50, and the second lateral wall 52 surround and form vat cavity 54 and a removal cavity 56. The vat cavity 54 extends from the base 36 to the removal cavity 56. The removal cavity 56 extends from the vat cavity 54 to the top end 44.

As shown in FIG. 3, for example, the housing 22 may include the cover 40 mounted to or otherwise disposed at (e.g., on, adjacent, or proximate) the top end 44 to enclose the removal cavity 56. The cover 40 may form a slot 58 through the cover 40 from the removal cavity 56 to an exterior of the housing 22. The slot 58 may be configured to allow passage of the fastener holder 34 into and out of the housing 22. Alternatively, the cover 40 may be installed on the top end 44 when the applicator assembly 20 is not in use (e.g., for storage). In this case, the cover 40 may not include the slot 58.

Figure 6:
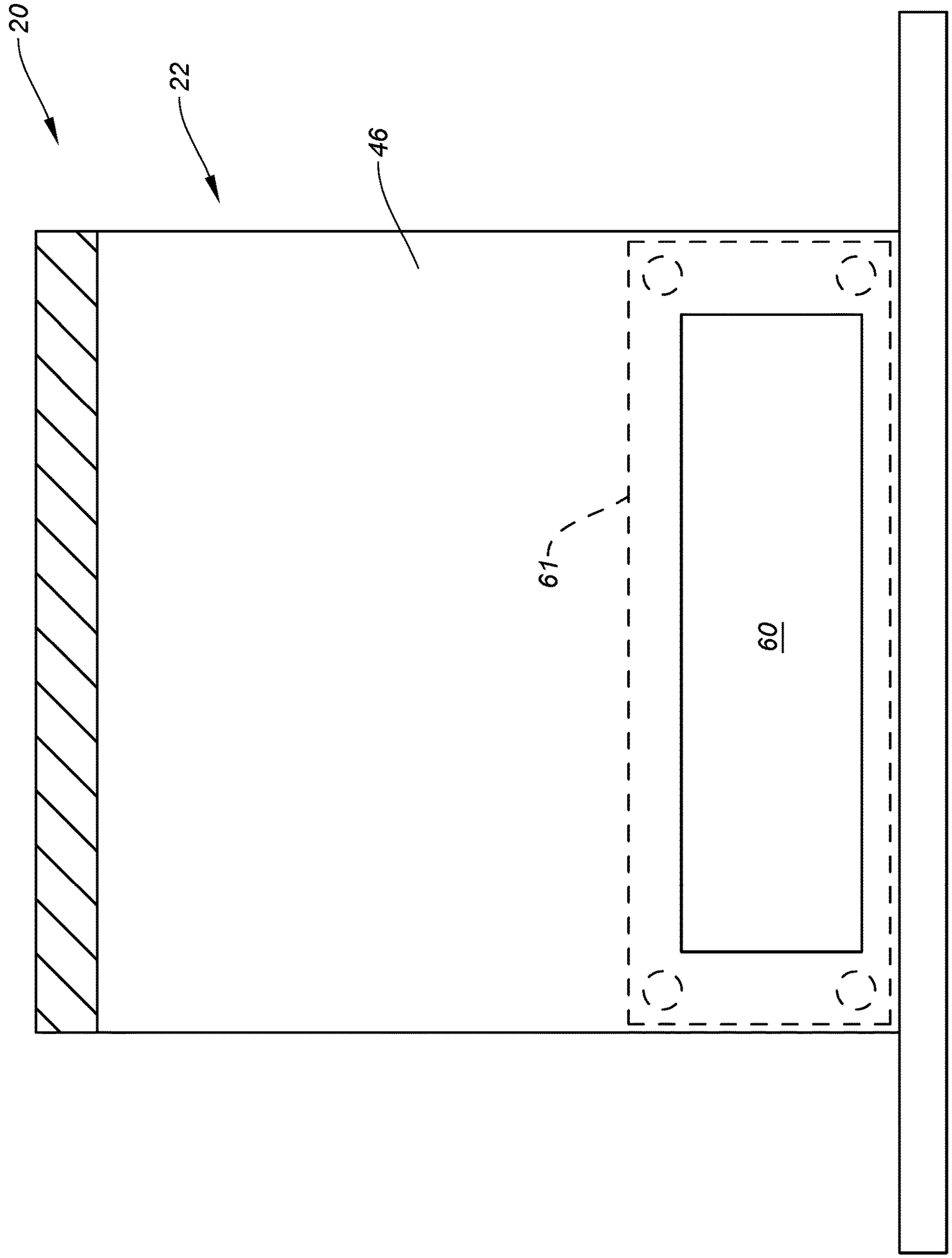
FIG. 6 illustrates a front view of the applicator assembly of FIG. 1, in accordance with one or more embodiments of the present disclosure.

Referring briefly to FIG. 6, the housing 22 may include a vat slot 60. For example, the front wall 46 may include the vat slot 60 formed through the front wall 46 with the vat slot 60 positioned coincident with the vat cavity 54 (see FIGS. 3 and 5). FIG. 6 illustrates a front view of the front wall 46 showing the vat slot 60. The vat slot 60 facilitates installation and removal of the vat body 24 from the vat cavity 54, for example, for cleaning or replacement of the vat body 24 (see FIGS. 3 and 5). The housing 22 may additionally include a cover plate 61 configured to cover the vat slot 60. The cover plate 61 may be selectively attachable and detachable from the sidewall assembly 38, for example, using one or more mechanical fasteners.

The housing 22 may form or otherwise include vat guides 62. The vat guides 62 may facilitate installation and removal of the vat body 24 relative to the housing 22 as well as secure positioning of the vat body 24 within the housing 22. For example, the first lateral wall 50 of FIG. 3 forms or otherwise includes a first vat guide 62 and the second lateral wall 52 of FIG. 3 forms or otherwise includes a second vat guide 62. Each of the vat guides 62 may extend inward from surrounding portions of the respective first and second lateral walls 50, 52. Each of the vat guides 62 may extend between and to the front wall 46 and the rear wall 48. Each of the vat guides 62 includes a guide surface 64 forming a portion of the vat cavity 54. For example, the guide surface 64 may face in a direction toward the base 36. The guide surface 64 may contact or otherwise be disposed proximate the vat body 24 with the vat body 24 installed in the housing 22 (e.g., in the vat cavity 54).

The vat body 24 extends between and to a bottom side 66 of the vat body 24 and a top side 68 of the vat body 24. The vat body 24 extends between and to a front side 70 of the vat body 24 and a rear side 72 of the vat body 24. The vat body 24 extends between and to a first lateral side 74 of the vat body 24 and a second lateral side 76 of the vat body 24. The vat body 24 forms a liquid cavity 78 at the top side 68. The liquid cavity 78 extends into the vat body 24 in a direction from the top side 68 toward the bottom side 66. The liquid cavity 78 may extend between the front side 70 and the rear side 72. The vat body 24 may enclose the liquid cavity 78 at (e.g., on, adjacent, or proximate) the front side 70 and/or the rear side 72 (e.g., the vat body 24 may form a front wall and/or a rear wall forming a portion of the liquid cavity 78). The vat body 24 may alternatively extend through the front side 70 and/or the rear side 72. The liquid cavity 78 may be disposed between and spaced from the first lateral side 74 and the second lateral side 76. The liquid cavity 78 may extend along a center plane 80 corresponding to a general position of the fastener holder 34 inserted into the housing 22. The vat body 24 may be slidingly mounted within the housing 22 to allow the vat body 24 to be inserted into or removed from the housing 22 through the vat slot 60, as previously discussed.

The vat body 24 may form or otherwise include one or more scrapers 82. The scrapers 82 may be positioned at (e.g., on, adjacent, or proximate) the liquid cavity 78 on the top side 68 of the vat body 24. For example, the scrapers 82 may include a first lateral scraper 82A on a first lateral side of the liquid cavity 78 and a second lateral scraper 82B on a second lateral side of the liquid cavity 78. The scrapers 82 may extend between and to the front side 70 and the rear side 72. Each of the scrapers 82 is configured to engage a respective roller of the at least one removal roller pair 28 to remove liquid from the respective roller and direct the liquid into the liquid cavity 78.

Each roller pair of the at least one applicator roller pair 26 includes a first lateral roller 26A and a second lateral roller 26B. The first lateral roller 26A and the second lateral roller 26B are disposed within the liquid cavity 78. For example, all or a substantial portion of the first lateral roller 26A and the second lateral roller 26B may be disposed within the liquid cavity 78. The first lateral roller 26A and the second lateral roller 26B are disposed at (e.g., on, adjacent, or proximate) the center plane 80. The first lateral roller 26A is disposed on a first lateral side of the center plane 80. The second lateral roller 26B is disposed on a second lateral side of the center plane 80 adjacent the first lateral roller 26A. Each of the first lateral roller 26A and the second lateral roller 26B is rotatable about a respective rotational axis 84A, 84B. The rotational axis 84A may be parallel to the rotational axis 84B. Each of the first lateral roller 26A and the second lateral roller 26B may extend between and to a front side 85 and a rear side 87 along the respective rotational axis 84A, 84B. The front side 85 may be disposed at (e.g., on, adjacent, or proximate) the front wall 46 or the vat body 24. The rear side 87 may be disposed at (e.g., on, adjacent, or proximate) the rear wall 48 or the vat body 24. Each of the first lateral roller 26A and the second lateral roller 26B may include a drive shaft 86 extending along the respective rotational axis 84A, 84B. The drive shaft 86 may extend from a respective one of the first lateral roller 26A or the second lateral roller 26B through the rear wall 48, for example, to the gear assembly 30 (see FIG. 7). The drive shaft 86 may additionally extend from a respective one of the first lateral roller 26A or the second lateral roller 26B through the vat body 24 at the rear side 72. The rollers 26A, 26B of the at least one applicator roller pair 26 may be formed all or in substantial part by a roller material such as, but not limited to, a nylon brush, a foam roller, or another suitable roller material for applying a liquid to the fasteners 200. The at least one applicator 26 of FIG. 3 includes a single roller pair 26, however, the present disclosure is not limited to the foregoing exemplary configuration of the at least one applicator roller pair 26 of FIG. 3.

Each roller pair of the at least one removal roller pair 28 includes a first lateral roller 28A and a second lateral roller 28B. The first lateral roller 28A and the second lateral roller 28B are disposed within the removal cavity 56. The first lateral roller 28A and the second lateral roller 28B are disposed at (e.g., on, adjacent, or proximate) the center plane 80. The first lateral roller 28A is disposed on a first lateral side of the center plane 80. The second lateral roller 28B is disposed on a second lateral side of the center plane 80 adjacent the first lateral roller 28A. Each of the first lateral roller 28A and the second lateral roller 28B is rotatable about a respective rotational axis 88A, 88B. The rotational axis 88A may be parallel to the rotational axis 88B. Each of the first lateral roller 28A and the second lateral roller 28B may extend between and to a front side 89 and a rear side 91 along the respective rotational axis 88A, 88B. The front side 89 may be disposed at (e.g., on, adjacent, or proximate) the front wall 46. The rear side 91 may be disposed at (e.g., on, adjacent, or proximate) the rear wall 48. Each of the first lateral roller 28A and the second lateral roller 28B may include a drive shaft 90 extending along the respective rotational axis 88A, 88B. The drive shaft 90 may extend from a respective one of the first lateral roller 28A or the second lateral roller 28B through the rear wall 48, for example, to the gear assembly 30 (see FIG. 7). The at least one removal roller pair 28 of FIG. 3 includes an upper removal roller pair 92 and a lower removal roller pair 94. However, the present disclosure is not limited to the foregoing exemplary configuration of the at least one removal roller pair 28 of FIG. 3. The lower removal roller pair 94 of FIG. 3 is disposed between the upper removal roller pair 92 and the vat body 24 along the center plane 80. The rollers 28A, 28B of the upper removal roller pair 92 may be positioned in contact with the rollers 28A, 28B of the lower removal roller pair 94, respectively. The rollers 28A, 28B of the lower removal roller pair 94 may be positioned in contact with the scrapers 82A, 82B, respectively. This configuration of the at least one removal roller pair 28 removes liquid from the rollers 28A, 28B and returns the liquid to the liquid cavity 78 as the rollers 28A, 28B rotate. The rollers 28A, 28B of the at least one removal roller pair 28 may be formed all or in substantial part by a roller material such as, but not limited to, a nylon brush, a foam roller, or another suitable roller material for removing a liquid from the fasteners 200.

Figure 7:
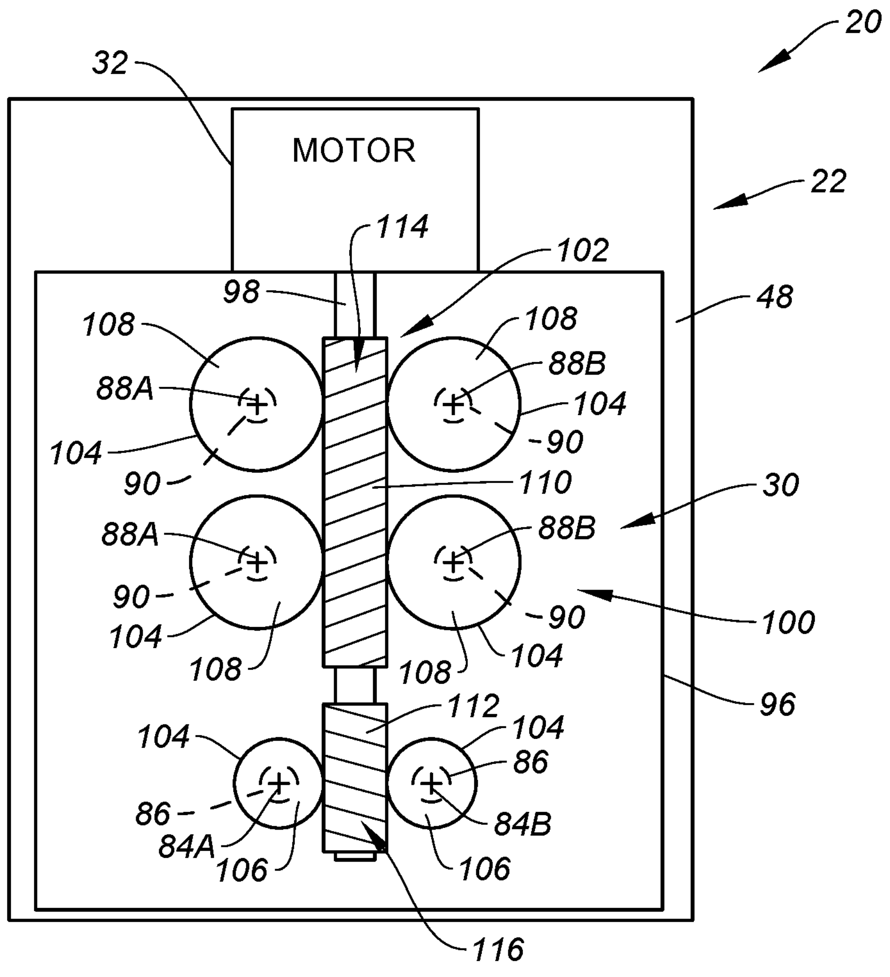
FIG. 7 illustrates a rear view of the applicator assembly of FIG. 1 including a gear assembly and a motor, in accordance with one or more embodiments of the present disclosure.

Referring to FIG. 7, the gear assembly 30 may be coupled with each of the drive shafts 86 and each of the drive shafts 90 to drive rotation of the at least one applicator roller pair 26 and the at least one removal roller pair 28. The gear assembly 30 may be disposed within a housing 96 mounted to the housing 22 (e.g., the rear wall 48). The gear assembly 30 of FIG. 7 is configured as a worm gear assembly, however, the present disclosure is not limited to any particular gear assembly configuration for the applicator assembly 20. The gear assembly 30 of FIG. 7 includes a includes a shaft 98, a plurality of worm gears 100, and a worm screw 102. Each of the worm gears 100 includes a gear pattern 104 (e.g., gear teeth) meshed with the worm screw 102. The worm gears 100 include an applicator roller gear 106 for each of the lateral rollers 26A, 26B and a removal roller gear 108 for each of the lateral rollers 28A, 28B. Each of the applicator roller gears 106 is interconnected with a respective one of the lateral rollers 26A, 26B by the drive shaft 86. The drive shafts 86 may be axially moveable within the applicator roller gears 106 along the rotational axes 84A, 84B to allow the lateral rollers 26A, 26B to be inserted or removed from the housing 22 through the vat slot 60 with the vat body 24. Each of the removal roller gears 108 is interconnected with a respective one of the lateral rollers 28A, 28B by the drive shaft 90. The worm screw 102 extends along the shaft 98. The worm screw 102 includes a first screw portion 110 and a second screw portion 112. The first screw portion 110 includes a first helical gear pattern 114 meshed with the gear pattern 104 of the removal roller gears 108. The second screw portion 112 includes a second helical gear pattern 116 meshed with the gear pattern 104 of the applicator roller gears 106. The first helical gear pattern 114 has a first helical gear pattern orientation (e.g., a clockwise or a counter-clockwise twist direction) which is opposite a second helical gear pattern orientation of the second helical gear pattern 114. The different helical gear pattern orientations of the first helical gear pattern 114 and the second helical gear pattern 116 drive rotation of the lateral rollers 26A, 26B in a direction opposite the lateral rollers 28A, 28B as shown, for example, in FIG. 3. The lateral rollers 26A, 26B may roll along (e.g., in contact with) the fastener holder 34 and/or the fasteners 200 in an upward direction carrying liquid from the liquid cavity 78 and applying the liquid to the fasteners 200 (e.g., the threading 206 and the contact face 208). The lateral rollers 28A, 28B may roll along (e.g., in contact with) the fastener holder 34 and/or the fasteners 200 in a downward direction removing the liquid from the fasteners 200 and directing the liquid down to the liquid cavity 78. The present disclosure is not limited to the foregoing exemplary configuration of the gear assembly 30.

The motor 32 may be mounted to the housing 22 (e.g., the rear wall 48) adjacent the gear assembly 30. The motor 32 of FIG. 7 is coupled with the shaft 98 to drive rotation of the shaft 98 and, hence, the roller pairs 26, 28. The motor 32 of FIG. 7 is disposed at (e.g., on, adjacent, or proximate) the top end 44 (see FIG. 3), however, the present disclosure is not limited to any particular position of the motor 32 relative to the housing 22. The motor 32 may be configured, for example, as an electric motor. However, the present disclosure is not limited to any particular configuration of the motor 32 for driving rotation of the shaft 98. In some alternative embodiments, the shaft 98 may be driven, for example, by a hand crank or other manual configuration to allow a human operator to drive rotation of the roller pairs 26, 28. In some other alternative embodiments, the applicator assembly 20 may include more than one motor 32 and each motor may be coupled with a respective one of the lateral rollers 26A, 26B, 28A, 28B to independently drive rotation of each of the lateral rollers 26A, 26B, 28A, 28B.

Figure 8:
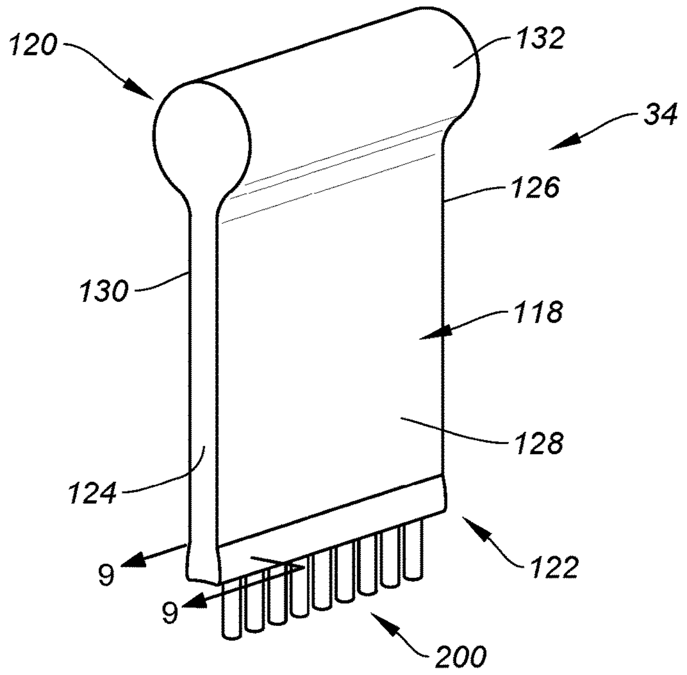
FIG. 8 illustrates a perspective view of a fastener holder for use with the applicator assembly of FIG. 1, in accordance with one or more embodiments of the present disclosure.
Figure 9A:
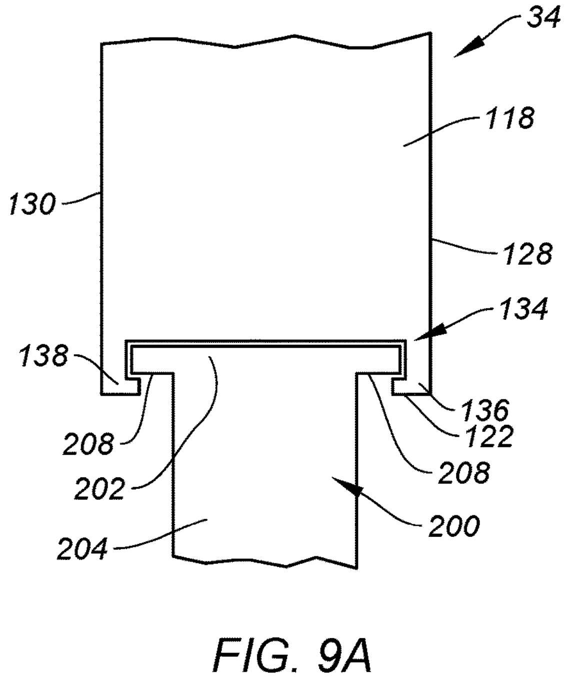
FIGS. 9A-B illustrate exemplary cross-sectional views of the fastener holder of FIG. 8 taken along Line 9-9 of FIG. 8, in accordance with one or more embodiments of the present disclosure.
Figure 9B:
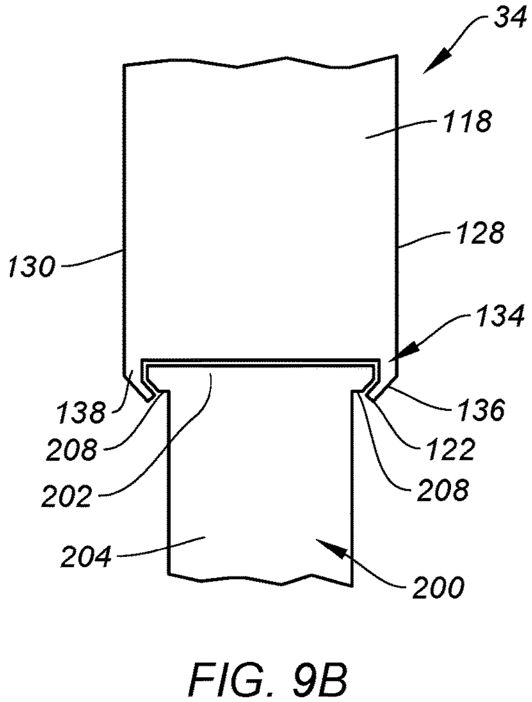

Referring to FIGS. 8 and 9A-B, the fastener holder 34 is configured to securely retain one or more of the fasteners 200 to facilitate insertion and removal of the fasteners relative to the applicator assembly 20. FIG. 8 illustrates a perspective view of the fastener holder 34 retaining a plurality of the fasteners 200. FIGS. 9A-B illustrate cross-sectional views of exemplary configurations of the fastener holder 34 and one of the fasteners 200 along Line 9-9 of FIG. 8. The fastener holder 34 of FIG. 9B, for example, is configured to securely retain fasteners 200 having a chamfered head 202 coincident with the contact face 208 and to allow the contact face 208 (e.g., the entire contact face 208) to be exposed to the applicator roller pair 26 (see, e.g., FIG. 3) for application of the liquid.

The fastener holder 34 of FIGS. 8 and 9A-B includes a holder body 118. The holder body 118 extends between and to a top end 120 of the holder body 118 and a bottom end 122 of the holder body 118. The holder body 118 extends between and to a front side 124 of the holder body 118 and a rear side 126 of the holder body 118. The holder body 118 extends between and to a first lateral side 128 of the holder body 118 and a second lateral side 130 of the holder body 118. The fastener holder 34 may additionally form or otherwise include a handle 132 disposed at (e.g., on, adjacent, or proximate) the top end 120. The holder body 118 of FIGS. 8 and 9A-B is configured to retain the fasteners 200 at the bottom end 122. For example, the holder body 118 may form a slot 134 of the fastener holder 34 extending through the holder body 118 along the bottom end 122 between the front side 124 and the rear side 126. The holder body 118 may form a first rail portion 136 and a second rail portion 138 at the bottom end 122 forming the slot 134. The first rail portion 136 may extend along the first lateral side 128. The first rail portion 136 may extend from the first lateral side 128 toward the second lateral side 130. The second rail portion 138 may extend along the second lateral side 130. The second rail portion 138 may extend from the second lateral side 130 toward the first lateral side 128. The first rail portion 136 and the second rail portion 138 may be configured to engage the head 202 of each of the fasteners 200 to securely retain the fasteners 200. The fasteners 200 may, therefore, be retained by the holder body 118 as an array of fasteners 200 extending between the front side 124 and the rear side 126. With the fasteners 200 securely retained by the holder body 118, the shaft 204 (e.g., the threading 206) and, in some cases, portions of the head 202 (e.g., the contact face 208) (see FIG. 1), of each of the fasteners 200 is disposed outside the holder body 118 and exposed for application of the liquid.

Referring to FIGS. 3 and 7, operation of the applicator assembly 20 will be described in greater detail. The fasteners 200 are inserted into the holder body 118 (e.g., into the slot 134) for retention by the holder body 118. The fasteners 200 are inserted into the housing 22 with the fastener holder 34 along the center plane 80. For example, the fastener holder 34 and the fasteners 200 may be inserted into the housing 22 through the slot 58. The gear assembly 30 and the motor 32 (see FIG. 7) may drive rotation of the applicator roller pair 26 and the removal roller pairs 28, as shown in FIG. 3. The fastener holder 34 is inserted into the housing 22 until the fasteners 200 are disposed within the liquid cavity 78. Contact between the fasteners 200 and the applicator roller pair 26 as the applicator roller pair 26 rotates applies the liquid (e.g., anti-seize paste) to the fasteners 200 (e.g., to the shaft 204 and threading 206 (see FIG. 1) of each of the fasteners 200). Once the fasteners 200 are coated with the liquid, the fasteners 200 are removed from the housing 22 by withdrawing the fastener holder 34 from the housing 22 along the center plane 80. As the fasteners 200 are withdrawn through the removal cavity 56, contact between the fasteners 200 and the removal roller pairs 28 as the removal roller pairs 28 rotate removes excess liquid (e.g., anti-seize paste) from the fasteners 200 and directs the removed, excess liquid back to the liquid cavity 78. Accordingly, the applicator assembly 20 facilitates application of a liquid to a plurality of fasteners 200 at once while also facilitating removal and reuse of excess liquid from the fasteners 200.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms “a,” “an,” and “the” refer to one or more than one, unless the context clearly dictates otherwise. For example, the term “comprising a specimen” includes single or plural specimens and is considered equivalent to the phrase “comprising at least one specimen.” The term “or” refers to a single element of stated alternative elements or a combination of two or more elements unless the context clearly indicates otherwise. As used herein, “comprises” means “includes.” Thus, “comprising A or B,” means “including A or B, or A and B,” without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An applicator assembly for applying a liquid to at least one fastener, the applicator assembly comprising:

a housing including a sidewall assembly, and the sidewall assembly extends between and to a bottom end and a top end;

a vat body disposed within the sidewall assembly, the vat body extends between and to a bottom side and a top side, the bottom side is disposed at the bottom end, the vat body forms a liquid cavity at the top side, and the vat body is slidably mounted within the housing;

at least one applicator roller pair disposed within the liquid cavity, the at least one applicator roller pair includes a first applicator roller and a second applicator roller, and each of the first applicator roller and the second applicator roller is configured for rotation about an applicator rotational axis; and at least one removal roller pair disposed between the liquid cavity and the top end, the at least one removal roller pair includes a first removal roller and a second removal roller, and each of the first removal roller and the second removal roller is configured for rotation about a removal rotational axis.

2. The applicator assembly of claim 1, wherein the liquid cavity extends along a center plane, the first applicator roller and the first removal roller are disposed on a first lateral side of the center plane, and the second applicator roller and the second removal roller are disposed on a second lateral side of the center plane.

3. The applicator assembly of claim 1, wherein the sidewall assembly includes a front wall, a rear wall, a first lateral wall, and a second lateral wall, the first lateral wall and the second lateral wall form guides extending from the front wall to the rear wall, and the guides are disposed at the top side of the vat body.

4. The applicator assembly of claim 1, further comprising a gear assembly coupled with the at least one applicator roller pair and the at least one removal roller pair.

5. The applicator assembly of claim 4, wherein the gear assembly includes a worm screw and a plurality of worm gears, the plurality of worm gears are meshed with the worm screw, and each worm gear of the plurality of worm gears is coupled with a respective roller of the at least one applicator roller pair or the at least one removal roller pair.

6. The applicator assembly of claim 5, wherein the worm screw includes a first screw portion and a second screw portion, the first screw portion has a first helical gear pattern, the second screw portion has a second helical gear pattern, the first helical gear pattern is opposite the second helical gear pattern, each worm gear coupled with the respective roller of the at least one applicator roller pair is meshed with the first screw portion, and each worm gear coupled with the respective roller of the at least one removal roller pair is meshed with the second screw portion.

7. The applicator assembly of claim 5, further comprising a motor, the motor is coupled to the worm screw, and the motor is configured to drive rotation of the worm screw.

8. The applicator assembly of claim 4, wherein the first applicator roller is configured to rotate in a first rotational direction, and the first removal roller is configured to rotate in a second rotational direction opposite the first rotational direction.

9. The applicator assembly of claim 1, wherein the vat body forms a first scraper and a second scraper on the top side, the first scraper contacts the first removal roller, and the second scraper contacts the second removal roller.

10. The applicator assembly of claim 9, wherein the first scraper and the second scraper are disposed at the liquid cavity.

11. The applicator assembly of claim 1, wherein the at least one removal roller pair includes a first removal roller pair and a second removal roller pair, the first removal roller of the first removal roller pair contacts the first removal roller of the second removal roller pair, and the second removal roller of the first removal roller pair contacts the second removal roller of the second removal roller pair.

12. The applicator assembly of claim 2, further comprising a fastener holder, the fastener holder includes a holder body, the holder body extends between and to an upper end and a lower end, the holder body is configured to retain the at least one fastener at the lower end, and the fastener holder is movable within the housing along the center plane.

13. The applicator assembly of claim 12, wherein the holder body extends between and to a front side and a rear side, the holder body forms a slot at the lower end, the slot extends from the front side to the rear side, and the holder body is configured to retain the at least one fastener within the slot.

14. An applicator assembly for applying a liquid to at least one fastener, the applicator assembly comprising:

a housing including a sidewall assembly, the sidewall assembly extends between and to a bottom end and a top end, and the sidewall assembly includes a front wall, a rear wall, a first lateral wall, and a second lateral wall;

a vat body slidably mounted within the housing at the bottom end, and the vat body forms a liquid cavity;

at least one applicator roller pair disposed within the liquid cavity, the at least one applicator roller pair includes a first applicator roller and a second applicator roller, and each of the first applicator roller and the second applicator roller is configured for rotation about an applicator rotational axis; and at least one removal roller pair disposed between the liquid cavity and the top end, the at least one removal roller pair includes a first removal roller and a second removal roller, and each of the first removal roller and the second removal roller is configured for rotation about a removal rotational axis;

wherein the vat body further forms a first scraper and a second scraper at the liquid cavity, the first scraper contacts the first removal roller, and the second scraper contacts the second removal roller.

15. The applicator assembly of claim 14, wherein the front wall forms a vat slot, and the vat body is configured to move into and out of the housing through the vat slot.

16. An applicator assembly for applying a liquid to at least one fastener, the applicator assembly comprising:

a housing including a sidewall assembly, and the sidewall assembly extends between and to a bottom end and a top end;

a vat body forming a liquid cavity within the sidewall assembly, and the liquid cavity extends along a center plane;

at least one applicator roller pair disposed within the liquid cavity, the at least one applicator roller pair includes a first applicator roller and a second applicator roller, each of the first applicator roller and the second applicator roller is configured for rotation about an applicator rotational axis, the first applicator roller is disposed on a first lateral side of the center plane, and the second applicator roller is disposed on a second lateral side of the center plane; and at least one removal roller pair disposed between the liquid cavity and the top end, the at least one removal roller pair includes a first removal roller and a second removal roller, each of the first removal roller and the second removal roller is configured for rotation about a removal rotational axis, the first removal roller is disposed on the first lateral side, and the second removal roller is disposed on the second lateral side;

wherein the first applicator roller is configured to rotate in a first rotational direction, and the first removal roller is configured to rotate in a second rotational direction opposite the first rotational direction.

17. The applicator assembly of claim 16, further comprising a fastener holder, the fastener holder includes a holder body, the holder body extends between and to an upper end and a lower end, the holder body is configured to retain the at least one fastener at the lower end, and the fastener holder is movable within the housing along the center plane.

* * * * *